Feb. 26, 1957  F. A. KROHM  Re. 24,974
2,782,445
WINDSHIELD WIPER BLADE ASSEMBLY AND PRESSURE DEVICE THEREFOR
Filed Jan. 14, 1954
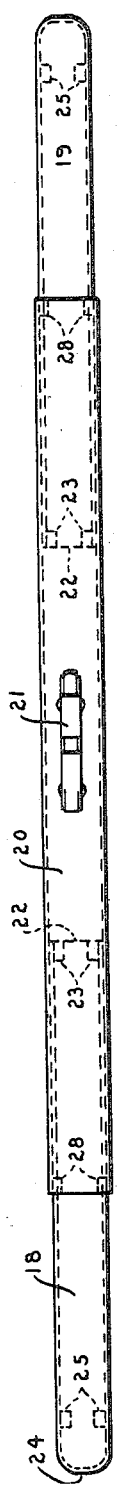
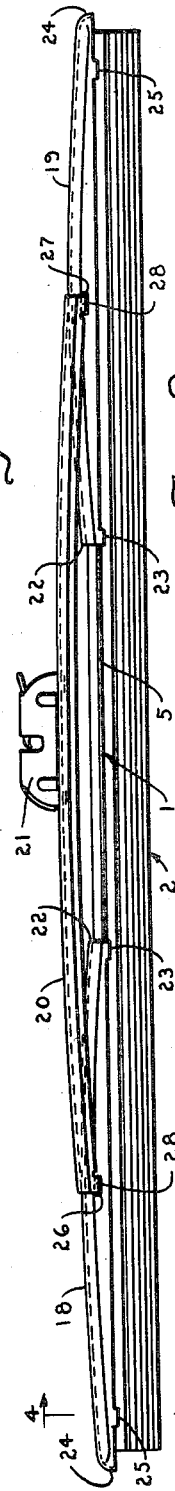
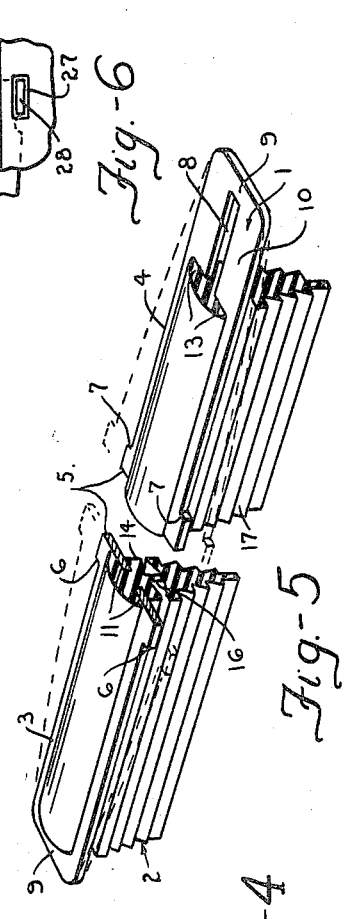
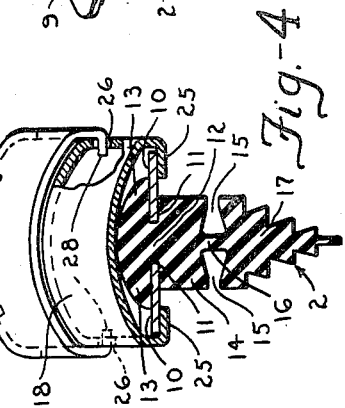
INVENTOR.
FRED A. KROHM
BY
Charles S. Perfect
ATTORNEY

United States Patent Office 2,782,445
Patented Feb. 26, 1957

2,782,445

WINDSHIELD WIPER BLADE ASSEMBLY AND PRESSURE DEVICE THEREFOR

Fred A. Krohm, Hobart, Ind., assignor to Productive Inventions, Inc., a corporation of Indiana Application January 14, 1954, Serial No. 404,052

25 Claims. (Cl. 15—245)

This invention relates generally to windshield wipers and more particularly to a wiper which will wipe a curved or flat windshield.

The wiper may be constructed in various ways but as herein shown comprises a blade assembly and a pressure distributing device operatively connected to the blade assembly. The blade assembly includes a resilient wiping element and a resiliently flexible support detachably connected to the element and the pressure device preferably includes a pair of secondary yokes having their ends connected to the blade at longitudinally spaced points, a primary yoke or bridge having its ends connected to intermediate portions of the secondary yokes, and a connector carried by the primary yoke for attachment with a wiper arm.

One of the important objects of the invention is to provide a blade assembly of which the support thereof is formed with reduced corresponding extremities to which the secondary yokes are respectively connected. More specifically in this regard, the support is of a lesser width or narrower at its extremities than along its central area. A secondary yoke slidably receives each of these extremities for applying pressure thereto and due to this variation in width, shoulders are formed on the support to provide abutments or stops which are engageable with the inner ends of the secondary yokes for predetermining the extent of the relative sliding movement between the pressure device and blade assembly.

A particular object of the invention is to provide a wiper in which the secondary yokes are preferably first slid onto reduced extremities of the support, after which the ends of the primary yoke may be readily snapped into connection with the secondary yokes for holding the parts operatively assembled.

A significant objective of the invention is to provide means for connecting the ends of the secondary yoke to the support in such a manner that portions of such ends will bear against the resilient wiper element in order to dampen or subdue vibration or noise between the pressure device and blade assembly.

A further object of the invention is to provide an arrangement whereby portions of the support of the blade assembly are substantially concealed from view by the secondary yokes.

An additional object of the invention is to provide an improved method of connecting the components of the pressure device together and to the blade assembly.

A specific object of the invention is to design and construct the primary and the secondary yokes arcuate in cross-section and substantially conceal from view the support to promote harmony and continuity and substantially prevent entry of snow, sleet and other foreign matter between the secondary yokes and support.

Other objects and advantages of the invention will become apparent after the description hereinafter set forth is considered in conjunction with the drawings annexed hereto.

In the drawings:

Figure 1 is a top view of the windshield wiper;
Figure 2 is a side view of the wiper shown in Figure 1;
Figure 3 is a partial bottom view of the wiper;
Figure 4 is a transverse section taken substantially on the line 4—4 of Figure 2 showing certain details of construction;
Figure 5 is a broken perspective view of the blade assembly illustrating other details of construction; and
Figure 6 is a partial sectional view from the inside of the blade showing the slots.

As exemplified in the drawings, the blade or refill assembly includes a resiliently flexible support 1 and a resilient wiper element 2. The support is elongated and of uniform thickness with corresponding reduced end extremities 3 and 4 and an intermediate portion 5 of a greater width than the extremities. This variation in width forms shoulders which provide longitudinally spaced abutment means 6 and 7. The support is preferably provided with an elongated narrow slot 8 terminating short of the ends of the support to provide connecting or hinge portions 9 whereby longitudinal parallel portions 10 of the support can be spread apart to enlarge the size of the slot so that the resilient element 2 can properly be located therein, after which the longitudinal portions 10 are released to cause such portions to interlock with the element as shown in Figure 5. As further shown in Figure 3, each of the longitudinal portions is provided with an aperture for receiving a tool to assist in spreading the portions apart.

The resilient element 2 is preferably formed in one piece with opposed longitudinally extending exterior grooves 11 therein to provide a neck 12. The grooves 11 receive the inner marginal edge portions of the longitudinal portions 10 with the neck 12 between such portions so that upper portions 13 and lower portions 14 of the element engage the upper and lower surfaces of the support as depicted in Figures 4 and 5. The element is further formed with a second pair of opposed longitudinally extending exterior grooves 15 to provide a hinge 16 to permit a controlled pivotal movement of a wiping head 17 having wiping edges thereon as shown.

As set forth above the pressure distributing device preferably includes a pair of corresponding secondary yokes 18 and 19 having their ends detachably connected to the support, a primary yoke 20 having its ends detachably connected to intermediate portions of the secondary yokes, and a connector 21 carried by the primary yoke for detachable connection with a wiper arm. It was also pointed out that each of the yokes is preferably arcuate in cross-section.

The secondary yokes 18 and 19 are preferably identical in design and construction. The inner end of the base wall of each secondary yoke is formed to provide a transverse arcuate or curved edge 22 and a pair of corresponding ears 23. The outer end of each secondary yoke is provided with a shroud-like end wall 24 which serves to conceal the ends of the support. The outer end of each of the yokes is also provided with a pair of ears 25 spaced inwardly from its end wall 24. As clearly shown in Figure 4, an arcuate portion of the base wall of each of the secondary yokes bears against the overlying portions 13 of the wiper element in a manner similar to the curved edges 22. The pairs of ears 23 and 25 of the yoke 18 extend under the rduced extremity 3 of the support and the corresponding ears of the yoke 19 similarly extend under the extremity 4 of the support to effect a sliding fit between these yokes and the support. The secondary yokes are preferably assembled with the support by merely sliding the yokes inwardly along the extremities of the support until the inner ends of the yokes engage the abutment means after which the primary yoke is attached to the secondary yokes in a manner which will be subsequently described.

The intermediate portion of the secondary yoke 18 is provided with a pair of generally rectangular slots 26 and the intermediate portion of the secondary yoke 19 with a pair of similar slots 27. The ends of the primary yoke are each provided with a pair of hooks 28 which are adapted to snap into the slots to interlock the primary yoke and secondary yokes. The hooks are preferably relatively rigid so that the end portions of the primary yoke will slightly expand as the hooks are cammed down over the secondary yokes into the slots, after which the end portions will retract to produce a good mechanical interlocking connection. The hooks on the primary yoke are preferably interconnected with the slots in the secondary yokes after the latter are assembled on the support as stated above, but if found desirable one of the secondary yokes can be first connected with either end of the primary yoke, after which the secondary yokes are assembled with the support so that the other end of the primary yoke can be snapped into connection with the other secondary yoke. The arrangement thus affords more than one way of assembling the yokes with respect to one another and the support.

It will be understood that by the use of a suitable hand tool, such, for example, as an ordinary pocketknife, such interlocking connection between the yokes may be released so that the blade assembly may be replaced with a "refill" of identical design, after which the connection may then be restored to its interlocking relationship.

When the pressure device and blade assembly are operatively connected together as illustrated in Figures 1 and 2 the wiping edges of the wiper element may be caused to conform either to a curved or flat surface or combinations of such surfaces. Attention is also directed to the fact that the secondary yokes are formed so that portions thereof straddle the reduced extremities of the support and serve to substantially conceal the outer longitudinal edge portions of the support and prevent entry of foreign matter between these yokes and the support. The end hinge portions 9 of the support are concealed by the shrouded end walls of the secondary yokes. It is further apparent that the overlapping portions 13 of the wiping element under the secondary yokes are also concealed.

In order to reduce noise or vibration between the pressure device and blade assembly the relationship between portions of the ends of the secondary yokes, the support and wiper element is such that the transverse curved marginal edges 22 provided on the inner ends of the secondary yokes will normally engage the upper surface of the upper part or overlapping portions 13 of the wiper element. Portions of the outer ends of the secondary yokes spaced from the end walls 24 also serve to engage the upper part of the element as shown in Figure 4. This bearing relationship between the element and secondary yokes provides a cushion for the parts and also assists in controlling relative lateral movement between these yokes and the blade assembly. Vibration is also reduced by limiting the extent of relative longitudinal movement between the blade assembly and pressure device. In other words, the distance between the inner ends of the secondary yokes and the abutment means 6 and 7 is predetermined so that just sufficient play is permitted to produce the desired working movement between the parts. Vibration or noise is further reduced by the relatively close fits established between the hooks 28 on the primary yoke and the pairs of apertures 26 and 27 in the intermediate portions of the secondary yokes.

Having thus described my invention, it is obvious that various modifications may be made in the same without departing from the spirit of the invention, and, therefore, I do not wish to be understood as limiting myself to the exact form, construction, arrangement and combination of parts herein shown and described.

I claim:
1. A windshield wiper comprising: a blade assembly having a resilient wiping element and a resiliently flexible support therefor having reduced end extremities forming with an intermediate portion thereof a pair of abutment means, and a pressure distributing device having a pair of secondary yokes with the ends of the yokes respectively connected to said end extremities and a primary yoke having its ends connected to the secondary yokes, the inner ends of the secondary yokes being cooperable with the abutment means for holding the pressure device and blade assembly together and predetermining relative movement therebetween.

2. A windshield wiper comprising: a blade assembly having a resilient wiping element and a resiliently flexible support therefor provided with integral abutment means intermediate its ends; a pressure distributing device having a pair of secondary yokes with their ends respectively connected to the support, a primary yoke having its ends connected to the secondary yokes, and a connector carried by one of the yokes for attaching the wiper to a wiper arm; the arrangement being such that the abutment means are located only between the inner ends of the secondary yokes for limiting relative longitudinal movement between the blade assembly and pressure device.

3. The structure defined in claim 2, in which the secondary yokes substantially conceal the support.

4. A windshield wiper comprising: a blade assembly having a resilient wiping element and a resiliently flexible support therefor, said support having a portion removed therefrom to provide an elongated slot within which the wiping element is detachably secured, said support also being of substantially uniform thickness and somewhat narrower adjacent its extremities than it is therebetween so as to provide a pair of longitudinally spaced integral abutments; a pressure distributing device having a pair of secondary yokes with the ends of one yoke connected to one of the narrow extremities of the support and with the ends of the other yoke being connected to the other narrow extremity of the support, said abutment means being located only between the inner ends of the yokes to provide stops therefor to limit relative longitudinal movement between the pressure device and blade assembly, means for applying pressure to the secondary yokes, and means carried by the applying means for attaching the wiper to actuating means therefor.

5. A windshield wiper comprising: a blade assembly having a resilient wiping element and a resiliently flexible support therefor having longitudinally extending marginal edge portions, a pressure distributing device having a pair of secondary yokes provided with means adjacent their ends for connecting them to the support, said connecting means and said yokes being so formed that the yokes substantially straddle and conceal from side view those portions of the said longitudinal edge portions of the support between the connecting means, means formed integrally on the support and located only between the inner ends of the yokes for engagement therewith to limit relative longitudinal movement between the yokes and blade assembly, a primary yoke having ends connected to the secondary yokes, and connection means carried by one of the yokes for attaching the wiper to actuating means therefor.

6. A windshield wiper comprising: a blade assembly having a resilient wiping element and a resiliently flexible support therefor, a pressure distributing device having a pair of secondary yokes connected to the blade assembly and a primary yoke having ends respectively connected to the secondary yokes and carrying connection means for attaching the wiper to actuating means therefor, the connection between one of the ends of the primary yoke and one of the secondary yokes comprising a pair of opposed openings provided in the secondary yokes and a pair of fingers provided on the primary yoke, the space between the openings being slightly less than the distance between the fingers so that the fingers can be snapped into the openings to provide an interlocking connection.

7. A windshield wiper comprising: a blade assembly having a resilient wiping element and a resiliently flexible support therefor having abutment means thereon, a pair of secondary yokes having integral portions attaching the yokes to the support with the abutment means spacing the yokes apart, and means for applying pressure to the yokes, the attachments between the secondary yokes and support being such that other integral portions of the secondary yokes will be caused to engage the wiping element.

8. In a refill assembly for windshield wiper blades, a resilient wiping element having an edge disposed to contact and wipe the windshield, an elongated flexible member engaging and supporting said wiping element at its opposite edge and longitudinally thereof, said flexible member carrying at least two projections each having an abutment surface facing away from the abutment surface of the other and facing toward, respectively, opposite extremities of the flexible member, said abutment surfaces on said projections being adapted for disposition between the inner ends of a pressure-distributing device for the refill assembly whereby to limit, to a predetermined extent, the longitudinal movement of said refill assembly with relation to such pressure-distributing device.

9. In a refill assembly for windshield wiper blades, a resilient wiping element having an edge disposed to contact and wipe the windshield, an elongated flexible member engaging and supporting said wiping element at its opposite edge and longitudinally thereof, said flexible member carrying at least two projections each having an abutment surface facing away from the abutment surface of the other and facing toward, respectively, opposite extremities of the flexible member, said abutment surfaces being so disposed on said projections as to contact portions of a pressure-distributing device for the refill assembly whereby to limit, to a predetermined extent, the longitudinal movement of said refill assembly with relation to such pressure-distributing device, said abutment surfaces each being disposed remote from the nearest extremity of the flexible member and providing the sole means for limiting such movement of the refill assembly on the device.

10. In a refill assembly for windshield wiper blades, a resilient wiping element having an edge disposed to contact and wipe the windshield, an elongated flexible member engaging and supporting said wiping element at its opposite edge and longitudinally thereof, said flexible member carrying at least two projections each having an abutment surface facing away from the abutment surface of the other and facing toward, respectively, opposite extremities of the flexible member, said abutment surfaces being so disposed on said projections as to contact portions of a pressure-distributing device for the refill assembly whereby to limit, loosely, to a predetermined extent, the longitudinal movement of said refill assembly with relation to such pressure-distributing device, said abutment surfaces each being disposed remote from the nearest extremity of the flexible member, said abutment surfaces being formed by narrowing a portion of said flexible member extending from the respective surface to the nearest extremity of said flexible member.

11. In a refill assembly for windshield wiper blades, a resilient wiping element having an edge disposed to contact and wipe the windshield, an elongated flexible member engaging and supporting said wiping element at its opposite edge and longitudinally thereof, said flexible member carrying at least two projections each having an abutment surface facing away from the abutment surface of the other and facing toward, respectively, opposite extremities of the flexible member, said abutment surfaces being so disposed on said projections as to contact portions of a pressure-distributing device for the refill assembly whereby to limit, loosely, to a predetermined extent, the longitudinal movement of said refill assembly with relation to such pressure-distributing device, said abutment surfaces each being disposed remote from the nearest extremity of the flexible member, said abutment surfaces being formed by reducing the width of the pressure receiving portions of said flexible member with relation to that portion of such member disposed therebetween.

12. In a refill assembly for windshield wiper blades, a resilient wiping element having an edge disposed to contact and wipe the windshield, an elongated flexible member engaging and supporting said wiping element at its opposite edge and longitudinally thereof, said flexible member carrying at least two projections each having an abutment surface facing away from the abutment surface of the other and facing toward, respectively, opposite extremities of the flexible member, said abutment surfaces being so disposed on said projections as to contact portions of a pressure-distributing device for the refill assembly whereby to limit, to a predetermined extent, the longitudinal movement of said refill assembly with relation to such pressure-distributing device, said abutment surfaces each being disposed remote from the nearest extremity of the flexible member and each being disposed normally inwardly of the longitudinal innermost portion of said flexible member adapted to be contacted by such pressure-distributing device.

13. A windshield wiper blade comprising a resilient wiper element, an inherently resilient and freely flexible support carrying said element, said support having a laterally outwardly extending shoulder facing an end of said support, a pressure-distributing yoke on said support and having one of its ends free to contact said shoulder, said yoke extending normally from said shoulder toward the said end of said support, said yoke being provided with engaging portions slidable on said support and by which a longitudinally extending end portion of said support is telescopically received by said yoke, and means limiting the extent of sliding action of said yoke away from said shoulder, said support having an outer lateral extremity lying within the outer extremity of said shoulder.

14. A windshield wiper as defined in claim 13, in which the opposite end of the support substantially corresponds to the end above described and another pressure-distributing yoke is similarly mounted on the support.

15. A windshield wiper comprising a resilient wiper element, an inherently resilient metallic support for said element having a pair of laterally outwardly extending shoulders facing toward the ends of said wiper element, a pair of metallic pressure-distributing yokes on said support, the major portion of each of said yokes being disposed between the corresponding shoulder and the adjacent end of said wiper element, and a bridge attachable to said yokes for joining the same to an actuating arm, said yokes being cooperable with said shoulders for determining the relative longitudinal movement between the yokes and support.

16. A windshield wiper comprising a resilient wiper blade assembly, a pair of secondary yokes each telescopically receiving one end portion of said assembly therein, said blade assembly providing a stop surface immediately adjacent to the inner end of each of said secondary yokes, a primary yoke having its opposite ends respectively secured to portions of said secondary yokes and a portion attachable to a wiper arm, one of said secondary yokes being abuttable with the adjacent stop surface upon limited relative longitudinal movement of said blade assembly and said yokes, thereby preventing displacement of said blade assembly.

17. A windshield wiper comprising a resilient wiping element and a flexible support therefor, a pair of secondary yokes, said secondary yokes slidably engaging said flexible support, said support having end portions of reduced width cooperating with a medial portion to define lateral shoulders facing toward the adjacent ends of said support, said secondary yokes having open inner ends adapted to abut said shoulders, and a primary yoke having opposed end portions respectively engageable with said secondary yokes, the attachment of said primary yoke to each of the secondary yokes in cooperation with the abutment of said secondary yokes with said shoulders serving to retain the secondary yokes in longitudinally spaced relation upon the flexible support and to prevent displacement of said support with respect to said secondary yokes.

18. A windshield wiper movable in an arcuate path across a windshield surface, comprising an elongated non-metallic resilient wiper element, a flexible metallic support for said element extending longitudinally along each marginal edge of said wiper element, said support having laterally extending stop surfaces spaced toward the center thereof from each end thereof, a metallic secondary yoke on either end of said support in engagement therewith, the major portions of said secondary yokes being disposed between said stop surfaces and said element ends and having inner end portions immediately adjacent said stop surfaces, and a primary yoke joining said secondary yokes and adapted for attachment to a wiper arm, metal-to-metal contact of said support stop surfaces with the inner end portions of said secondary yokes serving to hold the support assembled with the secondary yokes.

19. A windshield wiper comprising a resilient wiper blade assembly, a pair of secondary yokes having a cumulative length appreciably less than the length of said blade assembly, said secondary yokes each telescopically receiving one end of said blade assembly, said blade assembly providing a laterally projecting shoulder immediately adjacent to and lying toward the center of said assembly from the inner end of each of said secondary yokes, and a primary yoke having its opposite ends respectively attachable to portions of said secondary yokes and a portion attachable to a wiper arm, the shoulder associated with each secondary yoke preventing displacement of the blade assembly toward the opposite end of the wiper, while freely permitting reverse movement of the blade assembly.

20. In a wiper assembly, a resilient wiping element, means providing attachment surfaces outside the confines of said element, a pressure-transmitting yoke loosely engaging said means and adapted for attachment to an actuating mechanism biased toward a windshield, said yoke and said wiping element having nested portions in direct thrust engagement, whereby said yoke transmits the biasing force of the mechanism to said wiping element to urge the same against the windshield.

21. A windshield wiper blade comprising an elongated resilient wiping element and an elongated resiliently flexible support attached to the element, said support having a central portion of appreciable length and substantially uniform width and a pair of longitudinally extending extremities of lesser substantially uniform width forming with the central portion lateral abutments for limiting the sliding movement of a pressure device adapted for support on said extremities.

22. A windshield wiper blade comprising an elongated resilient wiping element and an elongated resiliently flexible support having longitudinal portions secured to and supporting the sides of the element, said support having a central portion of appreciable length and substantially uniform width, said support also having extremities the lengths of which are greater than the length of the central portion and the widths of which are substantially uniform and less than the width of said central portion to provide a pair of abutments for engagement with pressure means adapted to slide on said extremities.

23. A windshield wiper blade comprising an elongated resilient wiping element and resiliently flexible means supporting the element substantially throughout its length, said flexible means having reduced longitudinally extending extremities forming with an intermediate portion a pair of abutments for limiting free sliding movement of a pressure device adapted for connection with said extremities.

24. A windshield wiper blade comprising an elongated resilient wiping element and a resiliently flexible support for said element, said support having reduced longitudinally extending extremities forming with an intermediate portion a pair of abutments, and a pressure device having pressure-distributing means freely slidable on said extremities and limited in movement by said abutments.

25. A windshield wiper blade comprising an elongated resilient wiping means and resiliently flexible means supporting the wiping means substantially throughout its length, one of said means having reduced longitudinally extending extremities forming with an intermediate portion a pair of abutments for limiting free sliding movement of a pressure device adapted for connection with said extremities.

References Cited in the file of this patent

UNITED STATES PATENTS

| | | |
|---|---|---|
| 2,649,605 | Scinta et al. | Aug. 25, 1953 |
| 2,667,656 | Oishei | Feb. 2, 1954 |
| 2,713,695 | Oishei | July 26, 1955 |
| 2,739,336 | O'Shei | Mar. 27, 1956 |

FOREIGN PATENTS

| | | |
|---|---|---|
| 487,846 | Canada | Nov. 4, 1952 |
| 683,375 | Great Britain | Nov. 26, 1952 |
| 1,037,554 | France | May 6, 1953 |